(12) United States Patent
Shenouda et al.

(10) Patent No.: US 12,391,390 B2
(45) Date of Patent: Aug. 19, 2025

(54) SYSTEM AND METHOD FOR IDENTIFYING A HIGH-TEMPERATURE CONDITION OF AN ELECTRICAL CABLE FOR AN AIRCRAFT PROPULSION SYSTEM

(71) Applicant: Pratt & Whitney Canada Corp., Longueuil (CA)

(72) Inventors: Antwan Shenouda, Mississauga (CA); Fraz A. Kharal, Brampton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 150 days.

(21) Appl. No.: 18/372,500

(22) Filed: Sep. 25, 2023

(65) Prior Publication Data

US 2025/0100698 A1 Mar. 27, 2025

(51) Int. Cl.
*H02K 7/18* (2006.01)
*B64D 27/24* (2006.01)
*B64D 45/00* (2006.01)
*B64D 27/02* (2006.01)

(52) U.S. Cl.
CPC .......... *B64D 27/24* (2013.01); *B64D 45/00* (2013.01); *B64D 27/026* (2024.01)

(58) Field of Classification Search
CPC .. B60L 2200/10; B60L 2240/36; Y02T 50/60; F02C 6/206; G01K 3/005; G01K 7/42
See application file for complete search history.

(56) References Cited

U.S. PATENT DOCUMENTS

| | | | |
|---|---|---|---|
| 7,408,132 B2 | 8/2008 | Wambsganss | |
| 10,229,226 B2 | 3/2019 | Albero | |
| 2010/0254059 A1 | 10/2010 | Higuchi | |
| 2011/0210844 A1 | 9/2011 | Dey | |
| 2018/0056802 A1* | 3/2018 | Martel | B60L 53/18 |
| 2020/0083823 A1* | 3/2020 | Latulipe | B64D 31/09 |
| 2021/0018008 A1* | 1/2021 | Muldoon | F01D 25/18 |
| 2022/0196483 A1 | 6/2022 | Kobayashi | |
| 2022/0332429 A1 | 10/2022 | Calder | |

OTHER PUBLICATIONS

EP Search Report for EP Patent Application No. 24202605.2 dated Feb. 20, 2025.

\* cited by examiner

*Primary Examiner* — Muhammad S Islam
(74) *Attorney, Agent, or Firm* — Getz Balich LLC (57) ABSTRACT

An assembly for an aircraft propulsion system includes a propulsor, an electric motor, and an electrical distribution system. The electric motor is operably connected to the propulsor and operable to drive rotation of the propulsor. The electrical distribution system includes an electrical power source, an electrical cable, and a temperature protection assembly. The electrical cable electrically connects the electrical power source and the electric motor. The electrical cable extends through at least one thermal zone between the electrical power source and the electric motor. The temperature protection assembly includes a temperature sensor operable to sense a temperature in each thermal zone of the at least one thermal zone. The temperature protection assembly further includes a controller. The controller is configured to determine a zone temperature in the at least one thermal zone.

20 Claims, 6 Drawing Sheets

SYSTEM AND METHOD FOR IDENTIFYING A HIGH-TEMPERATURE CONDITION OF AN ELECTRICAL CABLE FOR AN AIRCRAFT PROPULSION SYSTEM

TECHNICAL FIELD

This disclosure relates generally to electrical distribution systems for an aircraft propulsion system and, more particularly, to systems and methods for identifying a high-temperature condition of an electrical cable for an electrical distribution system.

BACKGROUND OF THE ART

Propulsion systems for aircraft may include electrical loads such as electric motors configured to operate in combination with an engine to provide thrust for an associated aircraft. Operation of the electrical loads may contribute significant thermal energy to the electrical cables used to connect the electrical loads to a power source, thereby increasing an operational temperature of the electrical cables. Various systems and methods for facilitating electrical cable resistance to high-temperature conditions are known in the art. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an assembly for an aircraft propulsion system includes a propulsor, an electric motor, and an electrical distribution system. The electric motor is operably connected to the propulsor and operable to drive rotation of the propulsor. The electrical distribution system includes an electrical power source, an electrical cable, and a temperature protection assembly. The electrical cable electrically connects the electrical power source and the electric motor. The electrical cable extends through at least one thermal zone between the electrical power source and the electric motor. The temperature protection assembly includes a temperature sensor operable to sense a temperature in each thermal zone of the at least one thermal zone. The temperature protection assembly further includes a controller. The controller includes a processor in communication with a non-transitory memory storing instructions, which instructions when executed by the processor, cause the processor to determine a zone temperature in the at least one thermal zone using the temperature sensor, determine an electrical current flow through the electrical cable, and estimate a temperature of the electrical cable within the at least one zone using the determined zone temperature of the at least one thermal zone and the determined electrical current flow.

In any of the aspects or embodiments described above and herein, the at least one thermal zone may include a first thermal zone and a second thermal zone. The instructions, when executed by the processor, may further cause the processor to estimate the temperature of the electrical cable within the first thermal zone using the determined zone temperature of the first thermal zone and estimate the temperature of the electrical cable within the second thermal zone using the determined zone temperature of the second thermal zone.

In any of the aspects or embodiments described above and herein, the instructions, when executed by the processor, may further cause the processor to identify a presence or an absence of a high-temperature condition for the electrical cable by comparing the estimated temperature of the electrical cable to a high-temperature threshold. The presence of the high-temperature condition may be identified where the estimated temperature of the electrical cable is greater than or equal to the high-temperature threshold.

In any of the aspects or embodiments described above and herein, the instructions, when executed by the processor, may further cause the processor to generate a warning in response to identifying the presence of the high-temperature condition.

In any of the aspects or embodiments described above and herein, the instructions, when executed by the processor, may further cause the processor to identify a power limit for the electric motor. The warning may include the power limit.

In any of the aspects or embodiments described above and herein, the instructions, when executed by the processor, may further cause the processor to reduce an electrical power consumption of the electric motor in response to identification of the presence of the high-temperature condition.

In any of the aspects or embodiments described above and herein, the instructions, when executed by the processor, may further cause the processor to record an amount of time the estimated temperature of the electrical cable is greater than or equal to the high-temperature threshold.

In any of the aspects or embodiments described above and herein, the instructions, when executed by the processor, may further cause the processor to determine an initial zone temperature of the at least one thermal zone using the temperature sensor of each thermal zone of the at least one thermal zone, energize the electric motor to drive rotation of the propulsor, determine the zone temperature of the at least one thermal zone using the temperature sensor of each thermal zone of the at least one thermal zone subsequent to energizing the electric motor, and estimate the temperature of the electrical cable within the at least one zone using the determined zone temperature of the at least one thermal zone, the initial zone temperature of the at least one thermal zone, and the determined electrical current flow.

In any of the aspects or embodiments described above and herein, the electrical power source may be a motor controller for the electric motor.

In any of the aspects or embodiments described above and herein, the electrical distribution system may include a cable bundle. The cable bundle may include a plurality of adjoined electrical cables disposed within the at least one thermal zone. The electrical cable may be one of the plurality of electrical cables.

In any of the aspects or embodiments described above and herein, the instructions, when executed by the processor, may further cause the processor to determine a second electrical current flow through a second electrical cable of the plurality of electrical cables of the cable bundle using a second current sensor and estimate a second temperature of the second electrical cable within the at least one zone using the determined zone temperature of the at least one thermal zone and the determined second electrical current flow.

In any of the aspects or embodiments described above and herein, the temperature protection assembly may include one of the temperature sensor disposed within each thermal zone of the at last one thermal zone, and the instructions, when executed by the processor, may further cause the processor to determine the zone temperature of the at least one thermal zone using the temperature sensor of each thermal zone of the at least one thermal zone.

According to another aspect of the present disclosure, a method for identifying a high-temperature condition of an electrical cable of an electrical distribution system for an aircraft propulsion system is provided. The method includes determining an initial zone temperature of at least one thermal zone and energizing an electric motor to drive rotation of a propulsor of the aircraft propulsion system by supplying electrical power to the electric motor with an electrical cable of the electrical distribution system. The electrical cable extends through the at least one thermal zone. The method further includes determining a zone temperature of the at least one thermal zone subsequent to energizing the electric motor and while the electric motor is energized, determining an electrical current flow through the electrical cable, estimating a temperature of the electrical cable within the at least one zone using the determined zone temperature of the at least one thermal zone and the determined electrical current flow, and identifying a presence or an absence of the high-temperature condition for the electrical cable by comparing the estimated temperature of the electrical cable to a high-temperature threshold. The presence of the high-temperature condition is identified where the estimated temperature of the electrical cable is greater than or equal to the high-temperature threshold.

In any of the aspects or embodiments described above and herein, the method may further include controlling the electric motor to reduce a torque or a rotation speed of the electric motor in response to identifying the presence of the high-temperature condition for the electrical cable.

In any of the aspects or embodiments described above and herein, the method may further include operating an engine to drive rotation of the propulsor with an engine output shaft of the engine in combination with the electric motor and controlling the engine to increase a torque or a rotation speed of the engine output shaft in response to identifying the presence of the high-temperature condition of the electrical cable.

According to another aspect of the present disclosure, an assembly for an aircraft propulsion system includes an electrical load and an electrical distribution system. The electrical distribution system includes an electrical power source, an electrical cable, and a temperature protection assembly. The electrical cable electrically connects the electrical power source and the electrical load. The electrical cable extends through at least one thermal zone between the electrical power source and the electrical load. The temperature protection assembly includes a temperature sensor disposed within each thermal zone of the at least one thermal zone. The temperature protection assembly further includes a controller. The controller includes a processor in communication with a non-transitory memory storing instructions, which instructions when executed by the processor, cause the processor to determine an initial zone temperature of the at least one thermal zone using a temperature sensor of each thermal zone of the at least one thermal zone, energize the electrical load, determine a zone temperature of the at least one thermal zone using the temperature sensor of each thermal zone of the at least one thermal zone subsequent to energizing the electrical load, determine an electrical current flow through the electrical cable using a current sensor, and estimate a temperature of the electrical cable within the at least one zone using the determined zone temperature of the at least one thermal zone and the determined electrical current flow.

In any of the aspects or embodiments described above and herein, the instructions, when executed by the processor, may further cause the processor to identify a presence or an absence of a high-temperature condition for the electrical cable by comparing the estimated temperature of the electrical cable to a high-temperature threshold. The presence of the high-temperature condition may be identified where the estimated temperature of the electrical cable is greater than or equal to the high-temperature threshold.

In any of the aspects or embodiments described above and herein, the at least one thermal zone may include a first thermal zone and a second thermal zone. The instructions, when executed by the processor, may further cause the processor to estimate the temperature of the electrical cable within the first thermal zone using the determined zone temperature of the first thermal zone and estimate the temperature of the electrical cable within the second thermal zone using the determined zone temperature of the second thermal zone.

In any of the aspects or embodiments described above and herein, the electrical power source may be a battery.

In any of the aspects or embodiments described above and herein, the electrical power source may be a generator.

The present disclosure, and all its aspects, embodiments and advantages associated therewith will become more readily apparent in view of the detailed description provided below, including the accompanying drawings.

DETAILED DESCRIPTION

Figure 1:
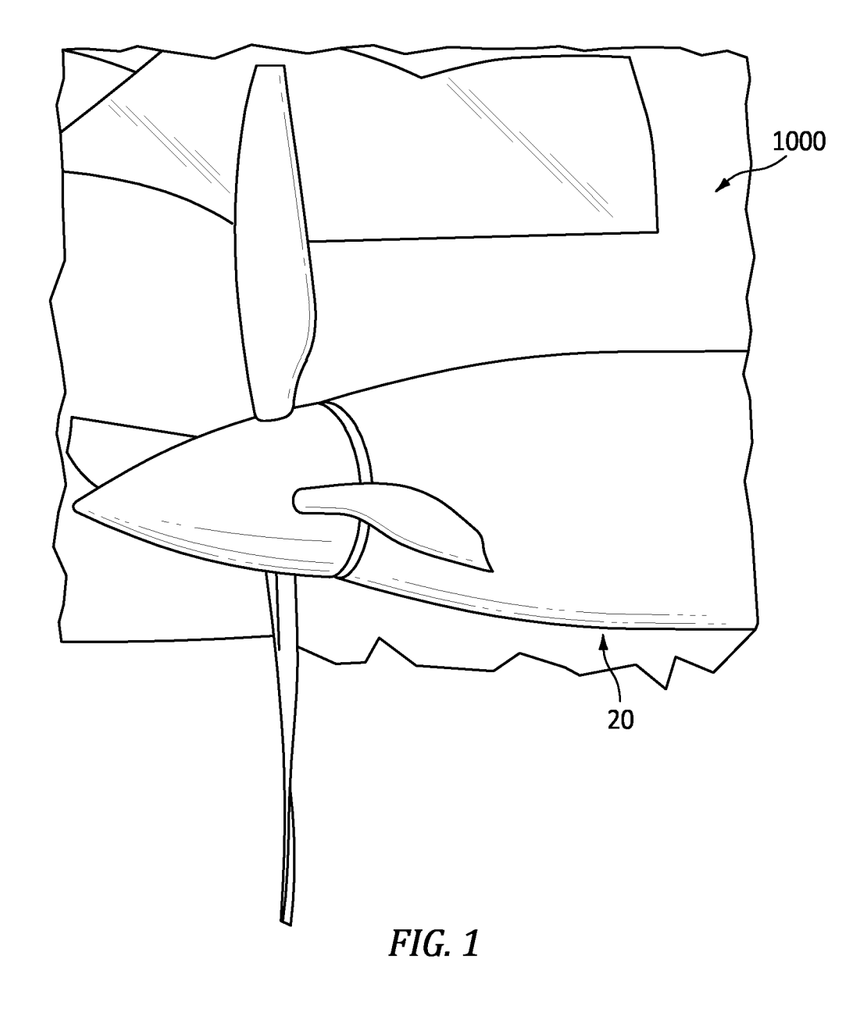
FIG. 1 illustrates a perspective view of a portion of an aircraft including a propulsion system, in accordance with one or more embodiments of the present disclosure.
Figure 2:
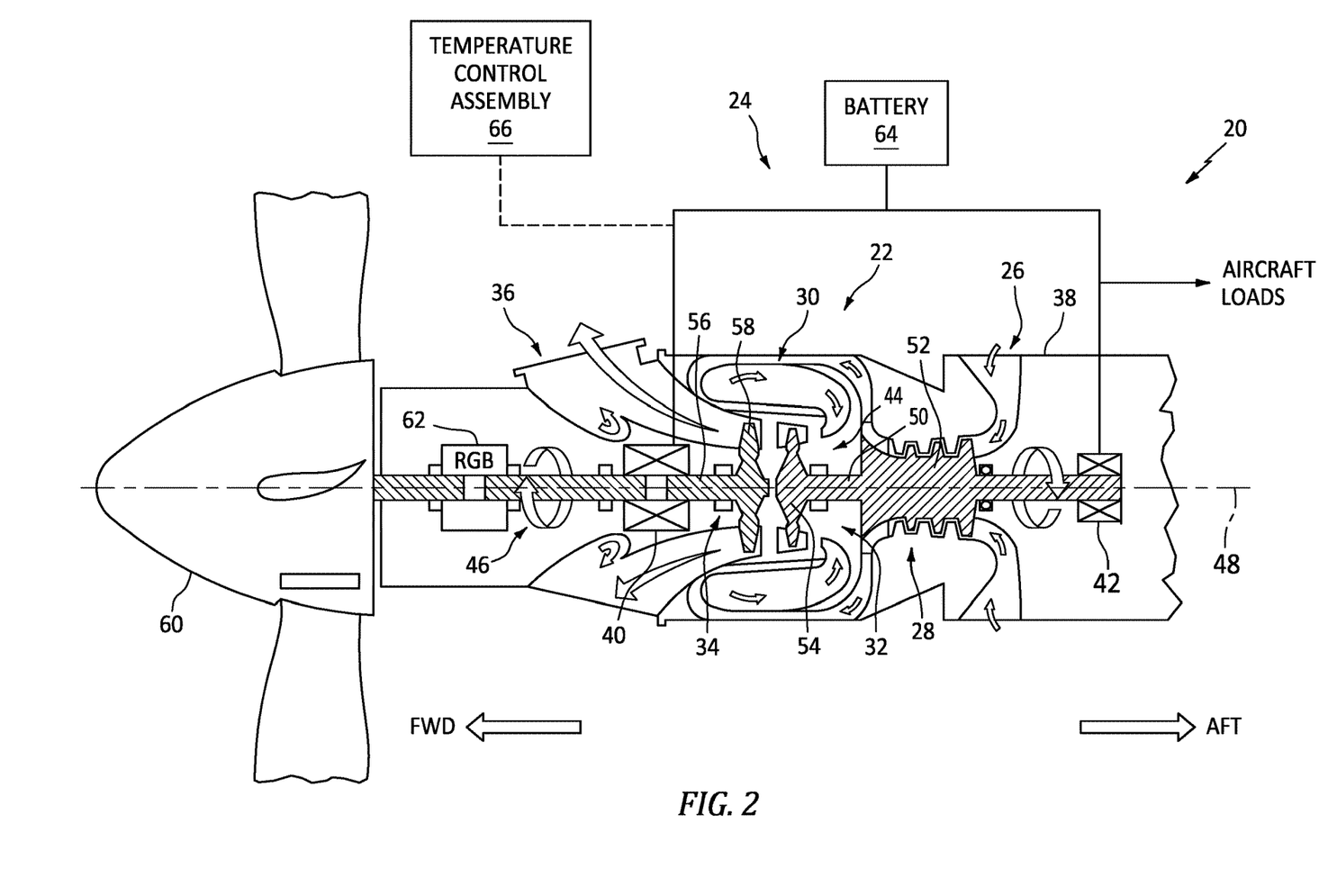
FIG. 2 schematically illustrates a side view of an aircraft propulsion system including a gas turbine engine, in accordance with one or more embodiments of the present disclosure.

FIGS. 1 and 2 illustrate a propulsion system 20 configured for an aircraft, such as the aircraft 1000 of FIG. 1. Briefly, the aircraft may be a fixed-wing aircraft (e.g., an airplane), a rotary-wing aircraft (e.g., a helicopter), a tilt-rotor aircraft, a tilt-wing aircraft, or any other aerial vehicle. Moreover, the aircraft may be a manned aerial vehicle or an unmanned aerial vehicle (UAV, e.g., a drone). The propulsion system 20 of FIG. 2 includes an engine 22. The present disclosure, however, is not limited to propulsion systems which include an engine, and may also be applicable to propulsion systems driven solely by electrical power (e.g., battery-electric propulsion systems). The propulsion system 20 further includes at least a portion of an electrical distribution system 24. The electrical distribution system 24 may shared by the aircraft 1000 and/or one or more additional propulsion systems for the aircraft 1000.

FIG. 2 illustrates a side, cutaway view of the engine 22. The engine 22 of FIG. 2 is configured as a hybrid-electric, turboprop gas turbine engine. However, the present disclosure may be equally applicable to other configurations of gas turbine engines such as, but not limited to, a turboshaft gas turbine engine, a turboprop gas turbine engine, a turbojet gas turbine engine, a propfan gas turbine engine, an open rotor gas turbine engine, an auxiliary power unit (APU), or the like. The present disclosure is also applicable to engines other than gas turbine engines such as, but not limited to intermittent combustion engines (e.g., rotary engines, piston engines, etc.). Moreover, the present disclosure is not limited to use with hybrid-electric propulsion systems.

The engine 22 of FIG. 2 includes an air inlet 26, a compressor 28, a combustor 30, a high-pressure turbine 32, a power turbine 34, an exhaust 36, an engine static structure 38, and an electric motor 40. The engine 22 may additionally include an electric generator 42. The engine static structure 38 may include, for example, one or more engine cases for the engine 22. The engine static structure 38 may additionally include cowlings, bearing assemblies, and/or other structural components of the engine 22. The one or more engine cases form, house, and/or structurally support one or more of the air inlet 26, the compressor 28, the combustor 30, the high-pressure turbine 32, the power turbine 34, the exhaust 36, the electric motor 40, and the electric generator 42.

Components of the engine 22, such as components of the compressor 28, the high-pressure turbine 32, and the power turbine 34, are arranged as a first rotational assembly 44 (e.g., a high-pressure spool) and a second rotational assembly 46 (e.g., a power spool). The first rotational assembly 44 and the second rotational assembly 46 are mounted for rotation about an axial centerline 48 (e.g., a rotational axis) of the engine 22 relative to the engine static structure 38.

The first rotational assembly 44 includes a first shaft 50, a bladed compressor rotor 52 for the compressor 28, and a bladed first turbine rotor 54 for the high-pressure turbine 32. The first shaft 50 interconnects the bladed compressor rotor 52 and the bladed first turbine rotor 54.

The second rotational assembly 46 includes a second shaft 56 and a bladed second turbine rotor 58 for the power turbine 34. The second shaft 56 (e.g., an engine output shaft) is connected to the bladed second turbine rotor 58. The second shaft 56 operably connects the bladed second turbine rotor 58 with a propulsor or other rotational load of the propulsion system 20. For example, the second shaft 56 of FIG. 2 operably connects the bladed second turbine rotor 58 with a propeller 60 of the propulsion system 20. The second shaft 56 may be directly or indirectly connected to the propeller 60. For example, the second shaft 56 may be interconnected with the propeller 60 by a reduction gear box (RGB) 62 configured to drive rotation of the propeller 60 at a reduced rotational speed relative to the second shaft 56.

During operation of the engine 22 of FIG. 2, ambient air enters the engine 22 through the air inlet 26 and is directed into the compressor 28. The ambient air is compressed by the bladed compressor rotor 52 and directed into a combustion chamber of the combustor 30. Fuel is injected into the combustion chamber and mixed with the compressed air to provide a fuel-air mixture. This fuel-air mixture is ignited, and combustion products thereof flow through and sequentially cause the bladed first turbine rotor 54 and the bladed second turbine rotor 58 to rotate. The rotation of the bladed first turbine rotor 54 and the bladed second turbine rotor 58 respectively drive rotation of the first rotational assembly 44 and the second rotational assembly 46. Rotation of the second rotational assembly 46 further drives rotation of the propeller 60 to provide propulsion for the propulsion system 20 and the aircraft 1000 (see FIG. 1). Combustion exhaust gas flowing past the bladed second turbine rotor 58 along is directed out of the engine 22 through the exhaust 36.

The electric motor 40 is electrically connected to the electrical distribution system 24 and configured to receive electrical power from the electrical distribution system 24 for operation of the electric motor 40. The electric motor 40 is configured to apply a rotational force to the second rotational assembly 46. The electric motor 40 may be directly or indirectly coupled to the second shaft 56 to drive the second shaft 56, at least in part, by applying a rotational force to the second shaft 56. For example, the electric motor 40 in combination with the bladed second turbine rotor 58 may provide the rotational force for driving the propeller 60. The electric motor 4 of FIG. 2 is illustrated in direct contact with the second shaft 56, however, the present disclosure is not limited to the exemplary configuration of the electric motor 40 of FIG. 2. For example, the electric motor 40 may be indirectly connected to the second shaft 56 by a gear box, a clutch assembly, or the like. The electric motor 40 may include or otherwise be electrically connected to a motor controller (e.g., an inverter), which motor controller may control electrical power (e.g., frequency, voltage, and/or current of the electrical power) supplied to the electric motor 40 from the electrical distribution system 24 to energize or deenergize the electric motor 40 and/or to control a rotation speed and/or torque of the electric motor 40.

As previously discussed, the engine 22 may additionally include the electric generator 42. The electric generator 42 of FIG. 2 is configured to generate and supply electrical power to the electrical distribution system 24. The electric generator 42 of FIG. 2, for example, is operably coupled to the first shaft 50. For example, the electric generator 42 may be directly connected to the first shaft 50. The electric generator 42 may alternatively be operably coupled to the first shaft 50 by an accessory gear box (not shown) or other speed-reducing gear assembly. The present disclosure is not limited to any particular operable connection between the first shaft 50 and the electric generator 42. The first shaft 50 drives rotation of the electric generator 42 to generate electrical power for the electrical distribution system 24. The electric generator 42 is electrically connected to the electrical distribution system 24 to supply electrical power for electrical loads of the propulsion system 20 and/or the aircraft 1000 (see FIG. 1). Electrical power for the electrical distribution system 24 may additionally or alternatively be provided by other electrical power sources which are independent of the propulsion system 20 such as, but not limited to, a generator of another propulsion system (e.g., for multi-propulsion-system aircraft), an auxiliary power unit (APU), a fuel cell (e.g., hydrogen fuel cell) assembly, or another power source disposed on the aircraft 1000 or otherwise outside of the propulsion system 20, and/or a ground-based power supply (e.g., an airport electrical distribution system, generator, or other electrical power supply or battery charging device) external to the aircraft 1000.

The electrical distribution system 24 is configured to supply electrical power for electrical loads of the propulsion system 20 and/or the aircraft 1000 (see FIG. 1). For example, the electrical distribution system 24 of FIG. 2 supplies electrical power to the electric motor 40 for operation of the electric motor 40. Examples of electrical loads for the aircraft 1000 include, but are not limited to, electronic control systems, environmental control systems, electric motors, lighting systems, communication systems, and the like. The electrical distribution system 24 of FIG. 2 includes a battery 64 and a temperature protection assembly 66. The electrical distribution system 24 may include additional electrical components such as, but not limited to, breakers, contactors, transformers, alternating current (AC) to direct current (DC) conversion components, DC to AC conversation components, and the like to effect operation of the electrical distribution system 24 to supply electrical power to the electrical loads of the propulsion system 20 and/or the aircraft 1000.

The battery 64 is configured to selectively supply electrical power to electrical loads of the electrical distribution system 24 independently or in combination with the electric generator 42 and/or other electrical power sources (e.g., an APU). The battery 64 may be disposed, for example, in the aircraft 1000 and/or its propulsion systems 20. The battery 64 may include a plurality of battery modules (e.g., battery packs), battery cells, and/or the like electrically connected together in series and/or parallel as necessary to configure the battery 64 with the desired electrical characteristics (e.g., voltage output, current output, storage capacity, etc.). The battery 64 (e.g., and its battery cells) may be configured as a rechargeable battery having a battery chemistry such as, but not limited to, lead acid, nickel cadmium (NiCd), nickel-metal hydride (Ni-MH), lithium-ion (Li-ion), lithium-polymer (Li-poly), lithium metal, and the like. The present disclosure, however, is not limited to any particular configuration of the battery 64.

Figure 3:
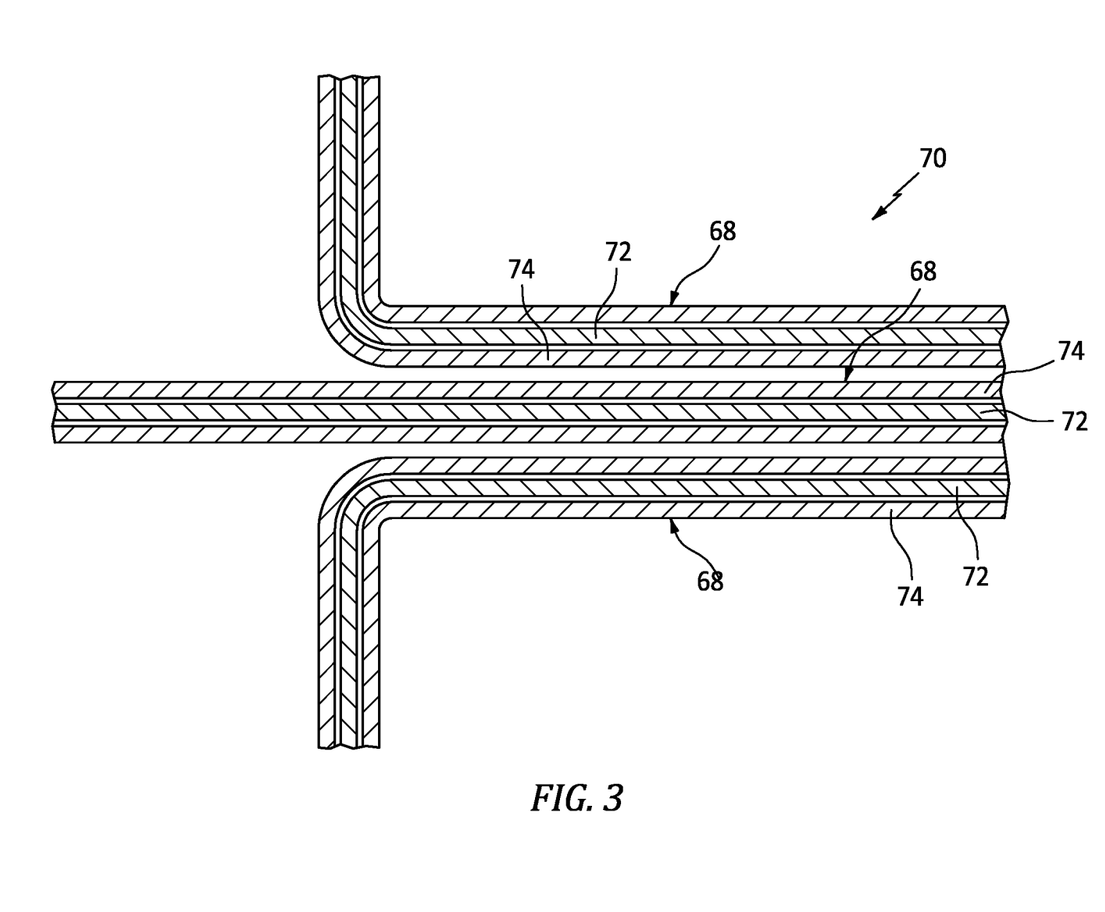
FIG. 3 illustrates a cutaway view of an electrical cable bundle for an electrical distribution system for an aircraft propulsion system, in accordance with one or more embodiments of the present disclosure.

Referring to FIGS. 2 and 3, electrical components of the propulsion system 20 (e.g., the electric motor 40, the electric generator 42, etc.), the electrical distribution system 24, and the aircraft 1000 (see FIG. 1) may be electrically interconnected by a plurality of electrically-conductive cables, wires, and the like (collectively referred to herein as "cables" or electrical cables"). FIG. 3 illustrates a cutaway view of a plurality of cables 68. The cables 68 of FIG. 3 are arranged as a bundle 70 in which the plurality of cables 68 are adjoined with each of the cables 68 disposed at (e.g., on, adjacent, or proximate) at least another of the cables 68 for at least a portion of their respective lengths. The present disclosure, however, is not limited to the arrangement of cables 68 arranged in bundles 70. Each of the cables 68 of FIG. 3 includes a conductor 72 and an insulation 74. The conductor 72 is an electrically conductive material such as, but not limited to, metal (e.g., copper) wire. The insulation 74 is an electrical insulating material such as, but not limited to, a plastic material (e.g., a thermoplastic or thermoset material). The insulation surrounds the conductor 72.

The insulation for an electrical cable may be rated based on an intended voltage for the conductor of the electrical cable. For example, higher conductor voltages may require increasingly thick insulation. Degradation of the insulation can lead to unintended electrical discharges and other electrical hazards such as, but not limited to, electrical arcing, fires, electrocution, electrical component failure, and the like. Maintaining the quality of the insulation, therefore, facilitates a reduction in likelihood of the aforementioned unintended electrical discharges and other electrical hazards.

One of the factors that may impact the quality and longevity of electrical cable insulation is the operating temperature of the insulation. The operating temperature of the insulation may be influenced, at least in part, by the operating temperature of the electrical cable conductor as well as the temperature of the environment surrounding the electrical cable. For example, the operating temperature to which the insulation may be exposed may be a function of electrical current flow through the conductor, the frequency of the electrical current (e.g., the "skin effect" for AC current), the proximity of the electrical cable conductor to an electrical cable conductor of another cable (e.g., the "proximity effect"), the quantity, proximity, and current flow of cables bundled cables, and the ambient temperature of the environment (e.g., based on cooling capability, altitude, proximity to an engine or other high-temperature system, etc.). Electrical cable insulation may additionally include a temperature rating based on the material or materials forming the insulation. As an example, some high-temperature insulation may support operating temperatures up to approximately 260 degrees Celsius (° C.). The present disclosure, however, is not limited to any particular electrical cable insulation temperature rating. Operating at or above the temperature rating of the insulation can degrade or otherwise negatively impact the insulation integrity and performance.

Figure 4:
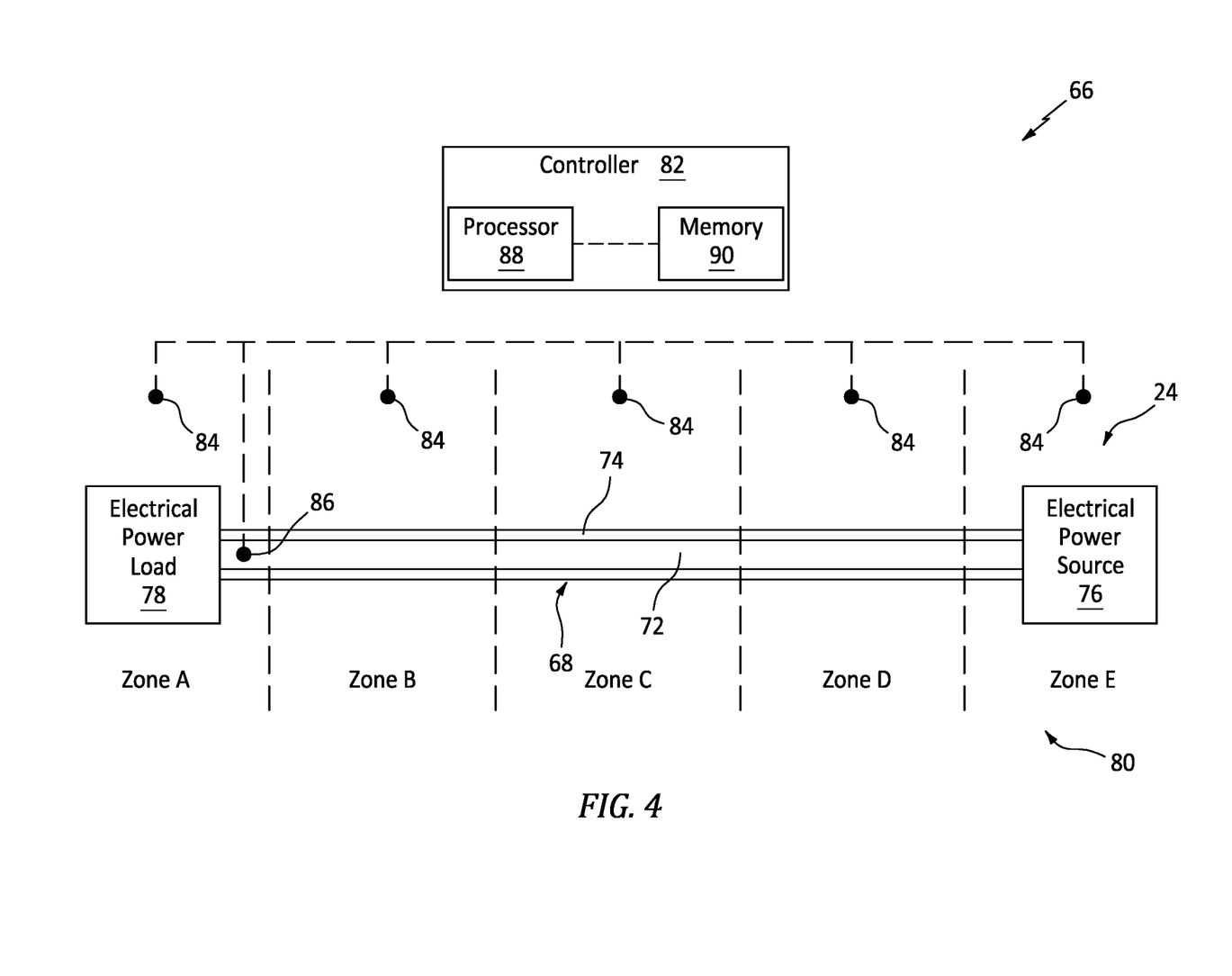
FIG. 4 schematically illustrates an electrical distribution system for an aircraft propulsion system, in accordance with one or more embodiments of the present disclosure.

FIG. 4 schematically illustrates an exemplary configuration of a portion of the electrical distribution system 24 and its temperature protection assembly 66. The electrical distribution system 24 of FIG. 4 includes an electrical power source 76 electrically connected with an electrical power load 78 by one of the electrical cables 68 of the electrical distribution system 24. As will be discussed in further detail, the cable 68 may extend through a plurality of thermal zones 80 along its length between the electrical power source 76 and the electrical power load 78. The cable 68 of FIG. 4 passes through five thermal zones 80 (e.g., Zones A-E) from the electrical power source 76 to the electrical power load 78, however, the present disclosure is not limited to any particular number of thermal zones 80. The different thermal zones 80 may represent different compartments, components, regions, or other portions of the aircraft 1000 (see FIG. 1) and/or the propulsion system 20 (see FIG. 2) which may have similar or different ambient temperatures or other thermal conditions. Examples of the thermal zones 80 include, but are not limited to, an aircraft fuselage, an aircraft wing, a propulsion system nacelle, an engine, and the like. The temperature protection assembly 66 includes a controller 82 and at least one temperature sensor 84. The temperature protection assembly 66 may additionally include one or more electrical current flow sensors 86.

The controller 82 includes a processor 88 and memory 90. The memory 90 is connected in signal communication with the processor 88. The processor 88 may include any type of computing device, computational circuit, or any type of process or processing circuit capable of executing a series of instructions that are stored in memory 90, thereby causing the processor 88 to perform or control one or more steps or other processes. The processor 88 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 90 may represent one or more algorithms for controlling aspects of the propulsion system 20, the electrical distribution system 24, and/or the temperature protection assembly 66, and the stored instructions are not limited to any particular form (e.g., program files, system data, buffers, drivers, utilities, system programs, etc.) provided they can be executed by the processor 88. The memory 90 may be a non-transitory computer readable storage medium configured to store instructions that when executed by one or more processors, cause the one or more processors to perform or cause the performance of certain functions. The memory 90 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 82 may be achieved via the use of hardware, software, firmware, or any combination thereof. The controller 82 may also include input and output devices (e.g., keyboards, buttons, switches, touch screens, video monitors, sensor readouts, data ports, etc.) that enable the operator to input instructions, receive data, etc. The controller 82 may be located within the propulsion system 20. Alternatively, the controller 82 may be located outside of the propulsion system 20 (e.g., on the aircraft 1000; see FIG. 1).

The controller 82 may form or otherwise be part of an electronic engine controller (EEC) for the propulsion system 10. The EEC may control operating parameters of the engine 22 including, but not limited to, fuel flow, stator vane position (e.g., variable compressor inlet guide vane (IGV) position), compressor air bleed valve position, propeller rotation speed, propeller blade pitch, etc. so as to control an engine power and/or thrust of the engine 22. The EEC may modulate fuel flow to the combustor 30 to obtain a desired output power of the engine 22. For example, the EEC may modulate the fuel flow using a closed-loop process in which an output power or other operating parameter of the engine 22 is measured and fuel flow is increased or decreased as a function of the measured output power or operational parameter. In some embodiments, the EEC may be part of a full authority digital engine control (FADEC) system for the propulsion system 20.

The temperature sensors 84 are connected in signal communication with the controller 82. The temperature sensors 84 are configured, for example, to generate an output signal (e.g., a digital signal, an electrical signal, etc.) representative of a temperature of the surrounding environment. The temperature sensors 84 may be configured, for example, as resistance temperature detectors (RTDs), thermocouples, thermal imagers, or the like, and the present disclosure is not limited to any particular configuration of the temperature sensors 84. The temperature sensors 84 are configured to sense a temperature of the thermal zones 80. As shown in FIG. 4, at least one of the temperature sensors 84 may be disposed within each thermal zone 80 (e.g., Zones A-E) through which the cable 68 extends. The temperature sensors 84 may be disposed at (e.g., on, adjacent, or proximate) the cable 68 or spaced from the cable 68 within the respective thermal zone 80. Alternatively, the temperature sensors 84 may be disposed outside the thermal zones 80 with each of the temperature sensors 84 configured to sense a temperature in one or more of the thermal zones 80. As previously discussed, the temperature protection assembly 66 may additionally include one or more of the electrical current flow sensors 86. The electrical current flow sensors 86 may be configured to measure a current flow through the conductor 72 of the cable 68. Alternatively, the controller 82 may be configured to receive a measured value of the current flow through the conductor 72 from another component of the electrical distribution system 24 or the electrical power load 78. For example, the controller 82 may receive a measured value of the current flow from a motor controller, an inverter, a battery monitoring system (BMS), which is representative of the electrical current flow through the conductor 72.

Figure 5:
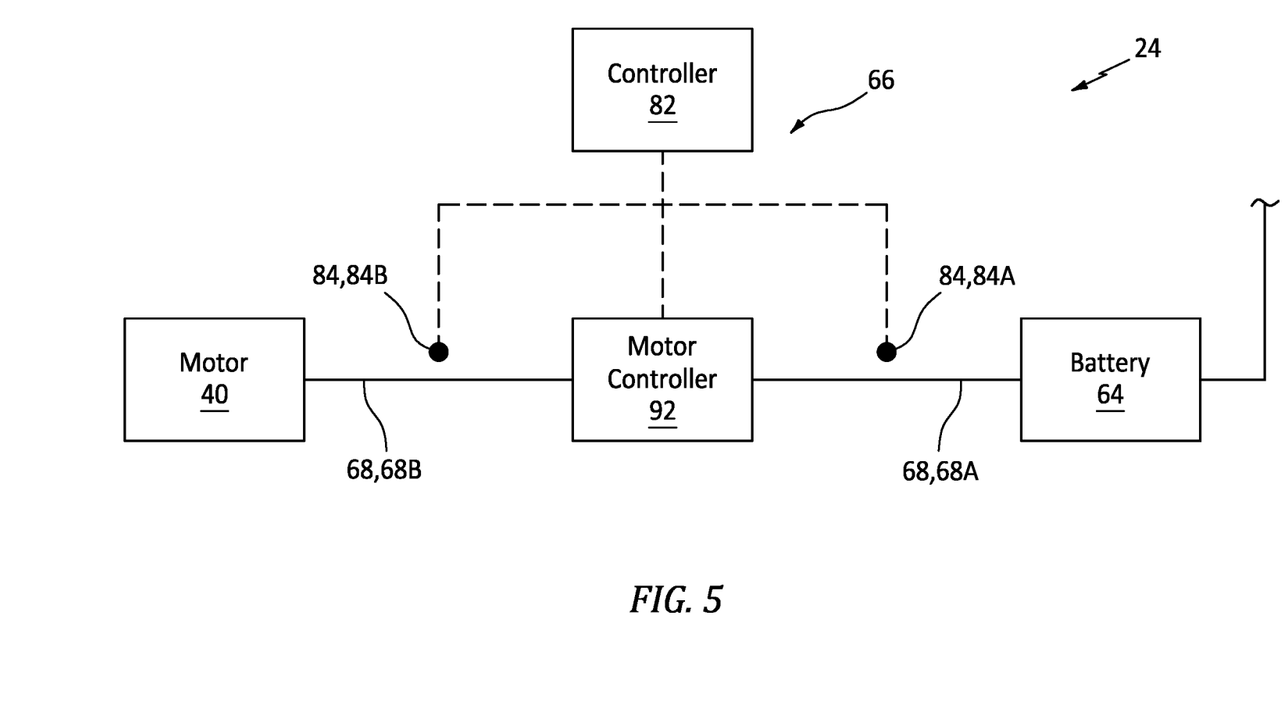
FIG. 5 schematically illustrates another electrical distribution system for an aircraft propulsion system including an electric motor, in accordance with one or more embodiments of the present disclosure.

FIG. 5 schematically illustrates another exemplary configuration of the electrical distribution system 24 and its temperature protection assembly 66. The electrical distribution system 24 of FIG. 5 includes the battery 64 configured to supply electrical power to the electric motor 40 through a motor controller 92 of the electrical distribution system 24. The motor controller 92 is configured to control electrical power (e.g., DC to AC conversion, frequency, voltage, and/or current of the electrical power) supplied to the electric motor 40 from the battery 64 to energize or deenergize the electric motor 40 and/or to control a rotation speed and/or torque of the electric motor 40. The motor controller 92 of FIG. 5 is connected in signal communication with the controller 82. The motor controller 92 may measure an electrical current flow supplied to the electric motor 40 and provide the measured electrical current flow to the controller 82. The controller 82 may additionally control operation of the motor controller 92 to control a rotation speed and/or torque of the electric motor 40. The battery 64 of FIG. 5 may be electrically connected to the motor controller 92 by a first cable 68A, 68 and the motor controller 92 of FIG. 5 may be electrically connected to the electric motor 40 by a second cable 68B, 68. The temperature protection assembly 66 of FIG. 5 may include at least one first temperature sensor 84A, 84 for the first cable 68A, 68 (e.g., within one or more thermal zones 80 through which the first cable 68A, 68 extends; see FIG. 4). The temperature protection assembly 66 of FIG. 5 may include at least one second temperature sensor 84B, 84 for the second cable 68B, 68 (e.g., within one or more thermal zones 80 through which the second cable 68B, 68 extends; see FIG. 4). The present disclosure, however, is not limited to the foregoing exemplary configuration of the electrical distribution system 24 and the temperature protection assembly 66 of FIG. 5.

Figure 6:
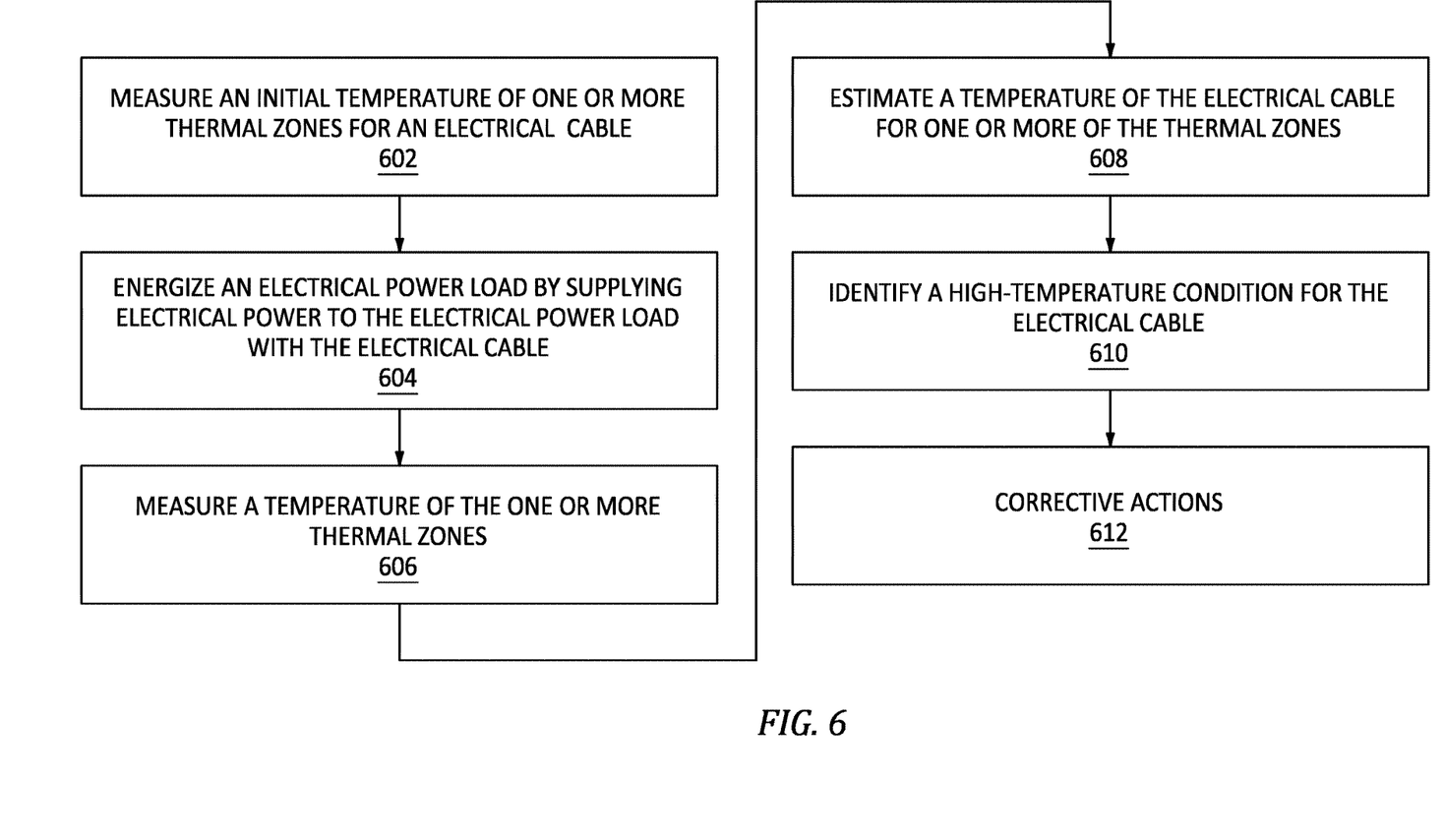
FIG. 6 illustrates a block diagram depicting a method for identifying a high-temperature condition for an electrical cable of an electrical distribution system for an aircraft propulsion system, in accordance with one or more embodiments of the present disclosure.

Referring to FIGS. 4-6, a Method 600 for identifying a high-temperature condition of an electrical cable of an electrical distribution system for an aircraft propulsion system is provided. FIG. 6 illustrates a flowchart for the Method 600. The Method 600 will be described herein, for example, with respect to the engine 22, the electrical distribution system 24, and the temperature protection assembly 66. The processor 88 may execute instructions stored in memory 90, thereby causing the controller 82 and/or its processor 88 to execute or otherwise control one or more steps of the Method 600. However, it should be understood that the Method 600 is not limited to use with the engine 22, the electrical distribution system 24, and the temperature protection assembly 66. Unless otherwise noted herein, it should be understood that the steps of Method 600 are not required to be performed in the specific sequence in which they are discussed below and, in some embodiments, the steps of Method 600 may be performed separately or simultaneously.

Step 602 includes, optionally, measuring an initial temperature of one or more of the thermal zones 80 for the cable 68 using the temperature sensors 84. The initial temperatures may be measured, for example, prior to (e.g., immediately prior to), concurrent with, or after (e.g., immediate after) initiating electrical current flow through the cable 68, for example, by supplying electrical power to the electrical power load 78 (e.g., the electric motor 40, the battery 64, etc.) from the electrical power source 76 (e.g., the battery 64, the electric generator 42 (see FIG. 2), the motor controller 92, an APU of the aircraft 1000 (see FIG. 1), a ground-based electrical power system, etc.). For example, the initial temperatures may be measured after a command has been received (e.g., by the controller 82) to energize the electrical power load 78 but while the electrical power load 78 is deenergized. Alternatively, the controller 82 may used a predetermined initial temperature of one or more of the thermal zones 80 for the cable 68, for example, stored in memory 90. A value of the predetermined initial temperature may be representative of an assumed or otherwise estimated temperature of the respective thermal zones 80 for the cable 68 (e.g., with the electrical power load 78 deenergized). The controller 82 may select one of a plurality of predetermined initial temperatures for each of the thermal zones 80 for the cable 68 based on one or more operating conditions of the aircraft 1000 and/or the propulsion system 20 (see FIGS. 1 and 2) such as, but not limited to, altitude, engine power, outside air temperature (OAT), or the like.

Step 604 includes, optionally, energizing the electrical power load 78 by directing electrical current through the cable 68 to the electrical power load 78 (e.g., from the electrical power source 76). For example, the controller 82 may control the motor controller 92 to apply electrical power to the electric motor 40 to cause the electric motor 40 to drive, at least in part, rotation of the propeller 60 (see FIG. 2). It should be understood, however, that aspects of the present disclosure Method 600 may also be performed for cables 68 and associated electrical power loads 78 which are deenergized to identify a high-temperature condition of the cables 68.

Step 606 includes measuring a temperature of one or more of the thermal zones 80 for the cable 68 using the temperature sensors 84. Step 606 may further include measuring an electrical current flow through the cable 68, for example, using the electrical current flow sensor 86 or another current flow measuring component of the electrical distribution system 24 or the electrical power load 78. Alternatively, a value of the electrical current flow may be assumed, for example, based on a known electrical power consumption of the electrical power load 78.

Step 608 includes estimating a temperature of the cable 68 (e.g., the insulation 74). Step 608 may first include estimating a temperature increase of the cable 68 relative to an initial temperature of the cable 68. For example, the cable 68 may be assumed to have an initial temperature (e.g., a cable 68 temperature prior to supplying electrical power to the electrical power load 78) which is the same as or substantially the same as the measured initial temperature or predetermined initial temperature of the one or more of the thermal zones 80 for the cable 68 (see Step 602). The temperature increase of the cable 68 subsequent to energization may be estimated, for example, using the following equation [1]:

$$\Delta T = \frac{I^2 R_{COND} t}{mC} + \Delta T_{ENV} + \Delta T_{INS}$$

where I is electrical current flow through the cable 68 (e.g., measured electrical current flow through the conductor 72), $R_{COND}$ is the electrical resistance of the conductor 72, t is an amount of time (e.g., seconds) for which electrical current has been flowing through the cable 68 (e.g., to the electrical power load 78), m is the mass of the conductor 72, C is the specific heat capacity of the conductor 72, $\Delta T_{ENV}$ is an estimated value of the temperature increase due to the ambient temperature of the thermal zone 80, and $\Delta T_{INS}$ is an estimated value of the temperature increase due to the insulation 74. The $\Delta T_{ENV}$ may be estimated, for example, using the measured temperature of the thermal zones 80 and a heat transfer coefficient $h_{ENV}$ between the cable 68 and the surrounding environment (e.g., air, other cables 68 of a cable bundle 70 of the thermal zones 80, structural components, etc.). The $\Delta T_{INS}$ may be estimated, for example, using the electrical resistance $R_{INS}$ of the insulation 74 and a heat transfer coefficient $h_{CABLE}$ between the conductor 72 and the insulation 74. Values of the electrical resistance $R_{COND}$, the electrical resistance $R_{INS}$, the mass m, the specific heat capacity C, and the heat transfer coefficients $h_{ENV}$, $h_{CABLE}$ may be known values or otherwise experimentally determined values. For example, routine experimentation and/or analysis may be performed by a person of ordinary skill in the art to determine suitable values of the electrical resistance $R_{COND}$, the electrical resistance $R_{INS}$, the mass m, the specific heat capacity C, and the heat transfer coefficients $h_{ENV}$, $h_{CABLE}$ for a particular aircraft 1000, propulsion system 20, electrical distribution system 24, and cable 68, in accordance with and as informed by one or more aspects of the present disclosure. Values of the electrical resistance $R_{COND}$ may be corrected based on a measured frequency of the electrical current flow I through the cable 68 (e.g., for AC electrical systems). The electrical resistance $R_{COND}$ may increase as the electrical current flow I increases, for example, due to the skin effect. The controller 82 may estimate the temperature of the cable 68 for each thermal zone 80 by adding the estimated temperature increase ΔT of the cable 68 for each thermal zone 80 to the measured or predetermined initial temperature for each thermal zone 80. The estimated temperature of the cable 68 may be provided to a pilot or other operator of the aircraft 1000 (see FIG. 1). For example, the estimated temperature of the cable 68 for the electric motor 40 may facilitate control by the pilot or other operator to maximize a propulsion power of the propulsion system 20 without exceeding a temperature limit of the cable 68.

Step 610 includes identifying a presence or an absence of a high-temperature condition for the cable 68. The controller 82 may compare the estimated temperature of the cable 68 (see Step 608) to a high-temperature threshold value. The controller 82 may identify the presence of the high-temperature condition for the cable 68, for example, where the estimated temperature of the cable 68 is greater than or equal to the high-temperature threshold value. The controller 82 may identify the absence of the high-temperature condition for the cable 68, for example, where the estimated temperature of the cable 68 is less than the high-temperature threshold value. The controller 82 may identify the presence or the absence of a high-temperature condition for one, more than one, or each thermal zone 80 that the cable 68 passes through. The high-temperature threshold value may be selected based on a temperature rating for the cable 68. For example, the high-temperature threshold value may be selected with a margin between the high-temperature threshold value and the temperature rating for the cable 68 to prevent exceeding the temperature rating.

Step 612 includes one or more corrective actions in response to identification of the presence of the high-temperature condition for the cable 68. The controller 82 may generate a warning (e.g., an audible alarm, a warning light, etc.) for a pilot or other operator of the aircraft 1000 (see FIG. 1). The controller 82 may identify a power limit for the electrical power load 78 (e.g., the electric motor 40), which power limit may be selected to facilitate a reduction of the cable 68 temperature below the high-temperature threshold value. The controller 82 may provide the power limit to the pilot or other operator of the aircraft 1000 with the warning.

The controller 82 may control a power output of the electric motor 40 and/or the engine 22 in response to identification of the presence of the high-temperature condition of the cable 68 for the electric motor 40. The controller 82 may control the electric motor 40 (e.g., using the motor controller 92) to reduce a power output (e.g., a torque or rotational speed) of the electric motor 40. Additionally, the controller 82 may increase a power output of the engine 22 (e.g., by increasing fuel flow to the combustor 30; see FIG. 2), in combination with reducing the power output of the electric motor 40, to maintain a constant or substantially constant rotational speed of the second shaft 56 (see FIG. 2).

The controller 82 may measure and record an amount of time that the presence of the high-temperature condition is identified for the cable 68. The controller 82 may additionally or alternatively measure and record the estimated temperature values of the cable 68 in excess of the high-temperature threshold value. The times and/or estimated temperatures of the cable 68 for the high-temperature condition may be used by the controller 82 or maintenance personal to identify a material condition of the cable 68, estimated an amount of cable 68 operational life remaining, and/or to determine that an inspection or replacement of the cable 68 should be performed.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An assembly for an aircraft propulsion system, the assembly comprising:

a propulsor;

an electric motor operably connected to the propulsor and operable to drive rotation of the propulsor; and an electrical distribution system including an electrical power source, an electrical cable, and a temperature protection assembly, the electrical cable electrically connects the electrical power source and the electric motor, and the electrical cable extends through at least one thermal zone between the electrical power source and the electric motor, and the temperature protection assembly includes a temperature sensor operable to sense a temperature in each thermal zone of the at least one thermal zone, and the temperature protection assembly further includes a controller, the controller includes a processor in communication with a non-transitory memory storing instructions, which instructions when executed by the processor, cause the processor to:

determine a zone temperature in the at least one thermal zone using the temperature sensor;

determine an electrical current flow through the electrical cable; and estimate a temperature of the electrical cable within the at least one zone using the determined zone temperature of the at least one thermal zone and the determined electrical current flow.

2. The assembly of claim 1, wherein the at least one thermal zone includes a first thermal zone and a second thermal zone, and the instructions, when executed by the processor, further cause the processor to:

estimate the temperature of the electrical cable within the first thermal zone using the determined zone temperature of the first thermal zone; and estimate the temperature of the electrical cable within the second thermal zone using the determined zone temperature of the second thermal zone.

3. The assembly of claim 1, wherein the instructions, when executed by the processor, further cause the processor to identify a presence or an absence of a high-temperature condition for the electrical cable by comparing the estimated temperature of the electrical cable to a high-temperature threshold, and wherein the presence of the high-temperature condition is identified where the estimated temperature of the electrical cable is greater than or equal to the high-temperature threshold.

4. The assembly of claim 3, wherein the instructions, when executed by the processor, further cause the processor to generate a warning in response to identifying the presence of the high-temperature condition.

5. The assembly of claim 4, wherein the instructions, when executed by the processor, further cause the processor to identify a power limit for the electric motor, and the warning includes the power limit.

6. The assembly of claim 3, wherein the instructions, when executed by the processor, further cause the processor to reduce an electrical power consumption of the electric motor in response to identification of the presence of the high-temperature condition.

7. The assembly of claim 3, wherein the instructions, when executed by the processor, further cause the processor to record an amount of time the estimated temperature of the electrical cable is greater than or equal to the high-temperature threshold.

8. The assembly of claim 1, wherein the instructions, when executed by the processor, further cause the processor to:

determine an initial zone temperature of the at least one thermal zone using the temperature sensor of each thermal zone of the at least one thermal zone;

energize the electric motor to drive rotation of the propulsor;

determine the zone temperature of the at least one thermal zone using the temperature sensor of each thermal zone of the at least one thermal zone subsequent to energizing the electric motor; and estimate the temperature of the electrical cable within the at least one zone using the determined zone temperature of the at least one thermal zone, the initial zone temperature of the at least one thermal zone, and the determined electrical current flow.

9. The assembly of claim 1, wherein the electrical power source is a motor controller for the electric motor.

10. The assembly of claim 1, wherein the electrical distribution system includes a cable bundle, the cable bundle includes a plurality of adjoined electrical cables disposed within the at least one thermal zone, and the electrical cable is one of the plurality of electrical cables.

11. The assembly of claim 10, wherein the instructions, when executed by the processor, further cause the processor to:

determine a second electrical current flow through a second electrical cable of the plurality of electrical cables of the cable bundle using a second current sensor; and estimate a second temperature of the second electrical cable within the at least one zone using the determined zone temperature of the at least one thermal zone and the determined second electrical current flow.

12. The assembly of claim 1, wherein the temperature protection assembly includes one of the temperature sensor disposed within each thermal zone of the at last one thermal zone, and the instructions, when executed by the processor, further cause the processor to determine the zone temperature of the at least one thermal zone using the temperature sensor of each thermal zone of the at least one thermal zone.

13. A method for identifying a high-temperature condition of an electrical cable of an electrical distribution system for an aircraft propulsion system, the method comprising:

determining an initial zone temperature of at least one thermal zone;

energizing an electric motor to drive rotation of a propulsor of the aircraft propulsion system by supplying electrical power to the electric motor with an electrical cable of the electrical distribution system, and the electrical cable extends through the at least one thermal zone;

determining a zone temperature of the at least one thermal zone subsequent to energizing the electric motor and while the electric motor is energized;

determining an electrical current flow through the electrical cable;

estimating a temperature of the electrical cable within the at least one zone using the determined zone temperature of the at least one thermal zone and the determined electrical current flow; and identifying a presence or an absence of the high-temperature condition for the electrical cable by comparing the estimated temperature of the electrical cable to a high-temperature threshold, and wherein the presence of the high-temperature condition is identified where the estimated temperature of the electrical cable is greater than or equal to the high-temperature threshold.

14. The method of claim 13, further comprising controlling the electric motor to reduce a torque or a rotation speed of the electric motor in response to identifying the presence of the high-temperature condition for the electrical cable.

15. The method of claim 14, further comprising:

operating an engine to drive rotation of the propulsor with an engine output shaft of the engine in combination with the electric motor; and controlling the engine to increase a torque or a rotation speed of the engine output shaft in response to identifying the presence of the high-temperature condition of the electrical cable.

16. An assembly for an aircraft propulsion system, the assembly comprising:

an electrical load; and an electrical distribution system including an electrical power source, an electrical cable, and a temperature protection assembly, the electrical cable electrically connects the electrical power source and the electrical load, and the electrical cable extends through at least one thermal zone between the electrical power source and the electrical load, and the temperature protection assembly includes a temperature sensor disposed within each thermal zone of the at least one thermal zone, and the temperature protection assembly further includes a controller, the controller includes a processor in communication with a non-transitory memory storing instructions, which instructions when executed by the processor, cause the processor to:

determine an initial zone temperature of the at least one thermal zone using a temperature sensor of each thermal zone of the at least one thermal zone;

energize the electrical load;

determine a zone temperature of the at least one thermal zone using the temperature sensor of each thermal zone of the at least one thermal zone subsequent to energizing the electrical load;

determine an electrical current flow through the electrical cable using a current sensor; and estimate a temperature of the electrical cable within the at least one zone using the determined zone temperature of the at least one thermal zone and the determined electrical current flow.

17. The assembly of claim 16, wherein the instructions, when executed by the processor, further cause the processor to identify a presence or an absence of a high-temperature condition for the electrical cable by comparing the estimated temperature of the electrical cable to a high-temperature threshold, and wherein the presence of the high-temperature condition is identified where the estimated temperature of the electrical cable is greater than or equal to the high-temperature threshold.

18. The assembly of claim 16, wherein the at least one thermal zone includes a first thermal zone and a second thermal zone, and the instructions, when executed by the processor, further cause the processor to:

estimate the temperature of the electrical cable within the first thermal zone using the determined zone temperature of the first thermal zone; and estimate the temperature of the electrical cable within the second thermal zone using the determined zone temperature of the second thermal zone.

19. The assembly of claim 16, wherein the electrical power source is a battery.

20. The assembly of claim 16, wherein the electrical power source is a generator.

* * * * *